United States Patent [19]
Mittal et al.

[11] Patent Number: 5,889,983
[45] Date of Patent: Mar. 30, 1999

[54] COMPARE AND EXCHANGE OPERATION IN A PROCESSING SYSTEM

[75] Inventors: Millind Mittal, South San Francisco, Calif.; Eval Waldman, Tivon, Israel

[73] Assignee: Intel Corporation, Santa Clara, Calif.

[21] Appl. No.: 781,351

[22] Filed: Jan. 21, 1997

[51] Int. Cl.[6] .................................................... G06F 12/00
[52] U.S. Cl. .......................... 395/564; 395/376; 395/561; 711/214; 711/220
[58] Field of Search .................................... 395/376, 561, 395/564; 711/214, 220

[56] References Cited

U.S. PATENT DOCUMENTS

| 5,668,967 | 9/1997 | Olson et al. | 395/842 |
| 5,696,939 | 12/1997 | Iacobovici et al. | 395/477 |
| 5,701,442 | 12/1997 | Ronen | 395/500 |

OTHER PUBLICATIONS

"Pentium Family User's Manual" vol. 3: Architecture and Programming Mode; Intel Corporation: 1994; primarily pp. 25-70-25-73.

John M. Mellor–Crummery and Michael L. Scott "Synchronization without Contention;" 1991 *ACM* 0–89791–380–9/91/0003–0269; pp. 269–278.

Maurice Herlihy "Wait–Free Synchronization" *ACM Transactions on Programming Lanuages and Systems*, vol. 11, No. 1, Jan. 1991, pp. 124–149.

*Primary Examiner*—Richard L. Ellis
*Assistant Examiner*—Saleh Najjar
*Attorney, Agent, or Firm*—Blakely, Sokoloff, Taylor & Zafman LLP

[57] ABSTRACT

A technique for providing a compare-and-exchange (CMPXCHG) instruction which may be implemented in an instruction set requiring a limited number of source and destination operands for each instruction in the instruction set. In order to utilize an instruction to perform a read-modify-write operation three source and one destination operands are needed to supply the location of various information used in executing the instruction. Instead of providing all four operands with the instruction, the CMPXCHG instruction of the present invention utilizes an implied operation-specific register. This register is implied in the instruction when the CMPXCHG instruction is executed, so that only two source operands are needed with the CMPXCHG instruction.

8 Claims, 5 Drawing Sheets

COMPARE AND EXCHANGE OPERATION IN A PROCESSING SYSTEM

BACKGROUND OF THE INVENTION

1. Field of the Invention

The present invention relates to the field of processors and, more particularly, to a technique for providing an instruction to perform a read-modify-write operation by use of a compare-and-exchange instruction.

2. Background of the Related Art

The formulation and utilization of an instruction set for a particular processor is well-known in the art. The instructions comprising the instruction set control the operation of the processor by delivering an encoded message that instructs the processor as to what actions are to be performed. Each instruction will typically have an opcode, which identifies the specific action (operation) to be performed, and operand(s), which can be comprised of source(s), destination(s) and/or the data itself.

The use and operation of an instruction set with a given processor or a processor family is well known. Where the instructions are employed in a single processor system, the accessing of data (which is typically stored in some form of memory) is not a concern from a system viewpoint, provided the processor is in control of all memory accessing operations in the system. In such a system, the memory accesses are controlled by the processor. However, in a multiple-processor system (or in a single processor system with other device(s) contending for memory access), the memory (or a portion of memory) may be accessible by more than one memory accessing device or agent. In this instance, some mechanism must be in place to ensure that only one memory accessing agent has access to change the common memory space on any given clock cycle. Without this protection, data being accessed by one agent can be corrupted by an access from another agent in the system. There are a variety of ways to control access to a shared memory space. One technique is the use of a semaphore.

For example, where a shared memory space is employed, access control to the shared memory space may be controlled by a semaphore (also referred to as a flag or lock) associated with the shared memory space. In using the semaphore as a control mechanism to the shared memory space, the semaphore is checked by each accessing agent before entry is permitted to the shared memory space. Accordingly, an agent first checks the state of the semaphore when entry to the shared memory space is sought. If it is available, the access is permitted for that agent. The acquiring agent changes the semaphore value to prevent entry by other agents. The acquiring agent then accesses the shared memory space for executing its routines. When shared memory access is no longer needed, the agent unlocks the lock and releases control of the shared memory space, so that another agent may access of the shared memory space.

There are many ways in which such semaphores can be implemented, including counters and shared variables. One technique of examining availability and making the semaphore busy is the use of a read-modify-write sequence (or operation). The read-modify-write operation generally involves three separate phases or actions. The read phase requires that some value (for example, a value associated with a status of the lock) be loaded. The modify phase involves checking the loaded value and performing some action to generate a new value for the lock value, if the first lock value allows access to be granted to the shared memory space. During this phase, some arbitrary modification is performed as part of a decision making process to notify other agents attempting access that access has already been granted. The write phase is a phase for completing the semaphore transaction, in which the original lock is changed based on the decision obtained during the modifying phase. Thus, a typical action is to store (write) the modifying value as the new lock value, if access to the shared memory space is available. The write releases the control over the lock, so that other agents may read the status of the lock value.

When the read-modify-write operation is implemented using a load and store (load/store) format, a load instruction is typically used to read the lock value and a store instruction is typically used to write to the lock to release it. The modify phase can be performed by one instruction or a sequence of instructions for obtaining the modified value. During the write phase, a store instruction is used for writing the modifying value to the lock.

With the implementation of the read-modify-write operation, one concern is the acquisition and the release of the semaphore mechanism itself. That is, when an agent attempts to gain control of the shared memory space, it must first read the lock value, check and modify (if permitted) the value and write the modifying value back to the lock. During this period, no other agent should be permitted access to check and modify the lock value. Otherwise a conflict could result when the second agent is given access control to the shared memory before the first agent was able to change the lock value. Thus, it is generally desirable to execute the read-modify-write operation as an atomic operation, instead as a number of instructions.

An atomic operation is an operation which is required to be completed without interruption once the operation begins to execute. By using an atomic operation, an agent can acquire (read) the semaphore, modify the value (if permitted) and release the semaphore by initiating a write to complete the operation before another agent attempts to acquire the lock. One such atomic instruction is known as a compare-and-exchange instruction. A compare-and-exchange instruction generally reads a first source data, compares it to another source data and if the comparison meets a predesignated condition (such as when a comparison is true), some modified value is written to a location, which may be the original location of the first source data. If the predesignated condition is not met, the original data in the location is not changed.

As will be noted, a read-modify-write operation is not a simple operation and typically requires a number of operands. The present invention provides for a novel technique of performing a read-modify-write operation by implementing a compare-and-exchange instruction, but in which the instruction format is shortened due to the use of an operation-specific register.

SUMMARY OF THE INVENTION

In one embodiment, the present invention involves for providing a read-modify-write operation by the use of an instruction, in which two of the three required source operands are specified in the instruction and the third operand is implied in an operation-specific register. In order to implement a read-modify-write operation in a single instruction, three source operands (such as SRC1, SRC2 and SRC3, as used hereinafter) and one destination operand (such as DEST, as used hereinafter) are utilized to supply the location of the various information used in executing the instruction.

Instead of providing all four operands with the instruction, the present invention utilizes an operation-specific register which is designated as a process-compare-operand (PCO) register. The PCO register is implied in the instruction. Accordingly, the instruction, for the described embodiment, has only two source operands specified by the instruction itself. The third source and the destination operands required in the execution of the instruction are implied. That is, the instruction utilizes the PCO register for providing the third source and the destination information when the instruction is executed, so that these two operands are not explicitly specified in the actual instruction format.

In the particular implementation of the present invention, a compare-and-exchange (CMPXCHG) instruction is utilized to provide the read-modify-write operation. In the example, when the CMPXCHG instruction is executed, the data accessed at an address location specified by SRC1 is compared to a reference value (associated with SRC2) which is present in the PCO register. If the comparison of the data and the reference value results in a predefined condition, then a modifying value (associated with SRC3) is written into the location specified by SRC1. The PCO register also serves as a destination register (DEST) for loading the original data.

DETAILED DESCRIPTION OF THE PREFERRED EMBODIMENTS

A technique for providing a read-modify-write operation by the use of a compare-and-exchange instruction, which may be implemented in an instruction set architecture of a computer system is described. In the following description, numerous specific details are set forth, such as a specific instruction, instruction formats, devices such as registers and memory, etc., in order to provide a thorough understanding of the present invention. However, it will be appreciated by one skilled in the art that the present invention may be practiced without these specific details. In other instances, well known techniques and structures have not been described in detail in order not to obscure the present invention. It is to be noted that a preferred embodiment of the present invention is described in reference to a load/store format, however, it is readily understood that other formats can be implemented as well without departing from the spirit and scope of the present invention.

Figure 1:
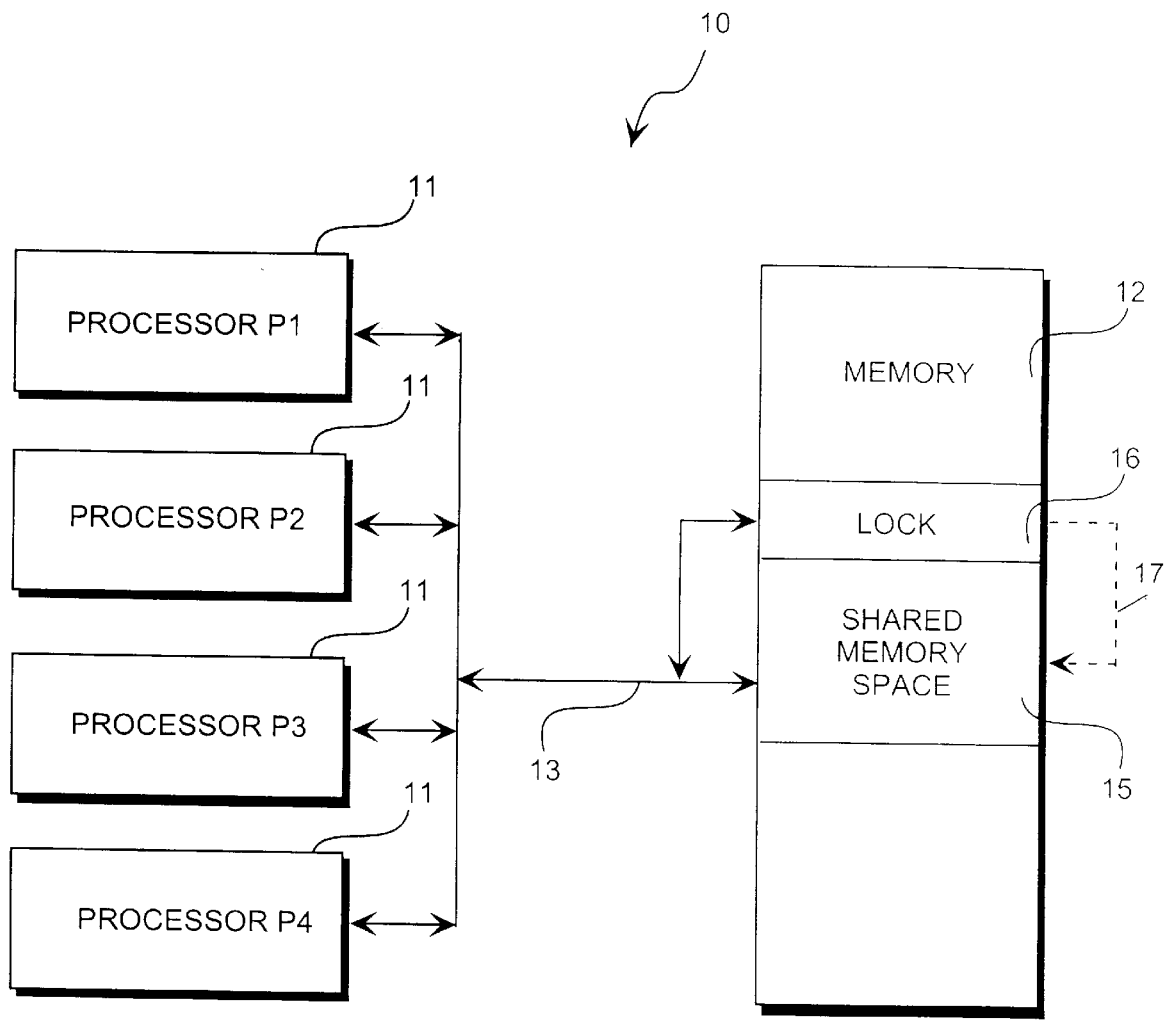
FIG. 1 shows a block diagram of a prior art computing system having a plurality of processors accessing a memory, wherein data located at a given location operates as a semaphore (lock) to permit only one processor at a time to control accesses to a shared area of memory.

Referring to FIG. 1, computer system 10 is shown having a plurality of processors 11 coupled to a memory 12 by a bus 13. In this particular computer system, four processors 11 (designated as processors P1, P2, P3 and P4) are shown as part of system 10. All four processors 11 are coupled to the memory 12 and specifically to a shared memory space 15 within the memory 12.

It is appreciated that the structure of the memory 12 can be comprised in a variety of ways. In the particular example, all four processors 11 access the memory 12 and in which a portion of the memory 12, designated as the shared space 15, is accessed by more than one processor 11. It is possible that there may be other shared areas within the memory 12, in which two or more processors 11 have the ability to access such shared areas. The non-shared areas of the memory 12 are generally relegated to access by one processor 11 only.

Accordingly, where locations in the memory 12 are accessed by a single processor 11 only, data dependency is a concern. Since other processors cannot access these areas to change the data, data corruption by these other processors is not a concern. However, where multiple processors can access locations in memory that are designated as shared locations, such as the shared space 15, some other control must be used to control and limit the access so that data being utilized by one processor is not corrupted by a second processor. One technique of implementing such control is by the use of a semaphore, previously mentioned in the background section above.

In FIG. 1, the semaphore employed is a lock (or lock variable) 16, which is assigned to control the accesses to the shared space 15 (as shown by dotted-line 17). The lock 16 is a particular location in memory that is assigned to contain a value associated with obtaining access to the shared space 15. Thus, in order for one of the processors 11 to access the shared space 15, it must first access the lock 16 and test the state (value) of the data stored in the lock location 16. In the simplest format, two values can be assigned to the lock 16. A first value indicating that the shared space is available for access and a second value indicating that the shared space is currently being utilized and, therefore, is not available for access. Again, in the simplest embodiment, bit states 1 and 0 can be used for the locked and unlocked states for the lock 16.

It is to be appreciated that the actual lock values and lock states for lock 16 is a design choice and many variations can be devised. Also, the location of the lock 16 need not be within memory 12 itself. However, since the present invention utilizes a load/store format for accessing the lock 16, it would be preferable to have a memory location assigned for lock 16. Furthermore, in reference to FIG. 1, it is appreciated that memory 12 can be one of a variety of memory devices. It is also possible that one or more of the processors 11 can be replaced by a memory accessing device(s) (devices such as direct memory access controllers), which also access(es) the memory. In these instances, these devices would function similar to the processors 11 described herein for gaining access to the shared space 15. These devices and processors are referred to as agents. Finally, although only a single bus 13 is shown, there may be a plurality of buses at the same or different hierarchical level(s) as bus 13 for coupling the various devices.

The accessing of the memory 12 by the processors 11 for data transfer typically involves the use of load and store operations. The load operation transfers memory content from a location in memory accessed and the store operation transfers data to a memory location accessed. Thus, load/store operations are used to access the memory 12 and the lock 16 for data transfer between the processors 11 and memory 12. The load and store accesses are also referred to as read and write accesses, respectively.

Figure 2:
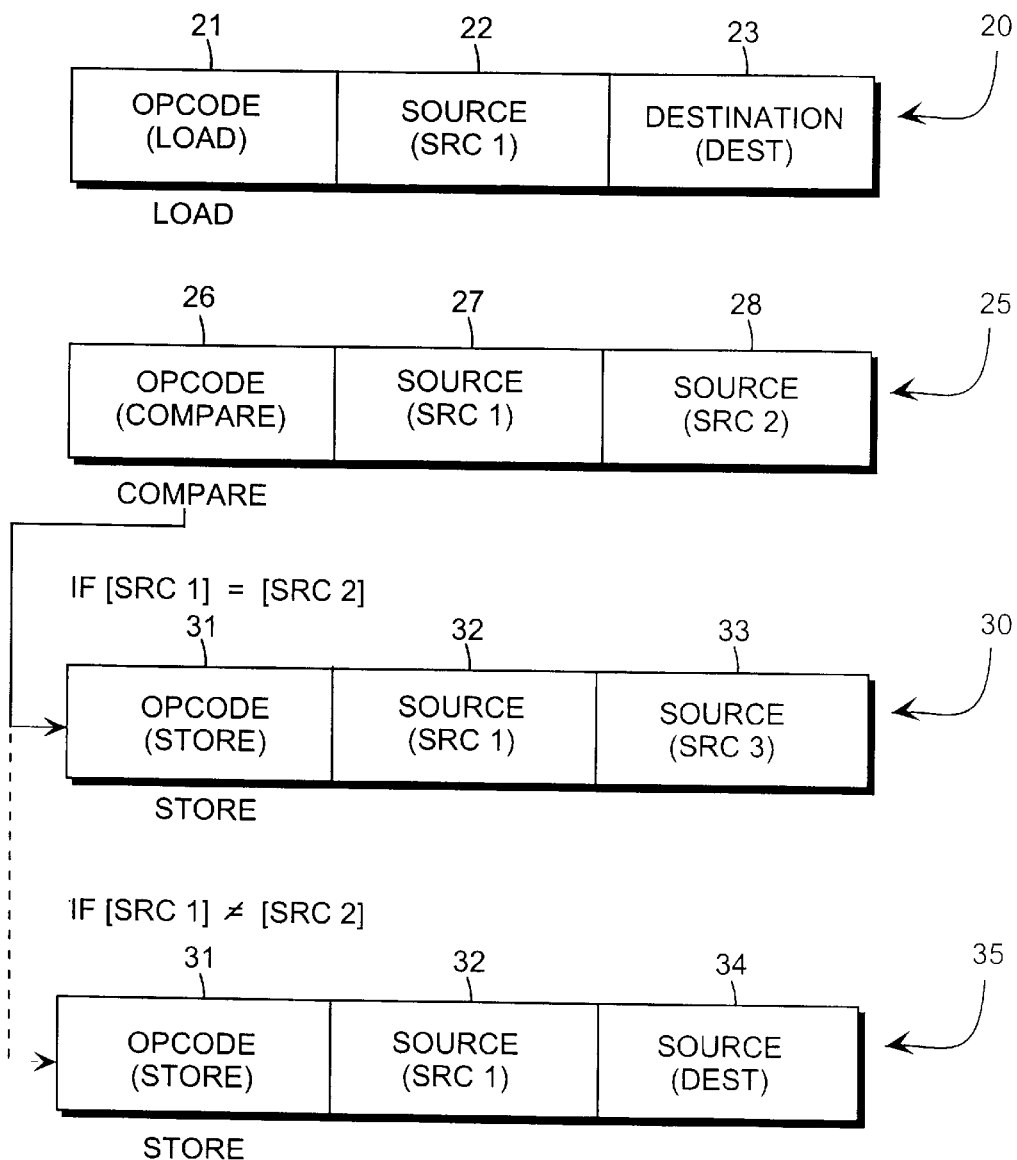
FIG. 2 shows an encoding scheme for a load, compare and store instructions for implementing a read-modify-write operation using a load/store format to acquire access of the lock of FIG. 1 in order to obtain access to the shared memory area.

Referring to FIG. 2, it shows an example of an operation sequence for testing and setting the lock 16, in order to acquire access to the shared space 15 by one of the processors 11. Three instructions are shown in FIG. 2 to perform the test-and-set sequence on lock 16. A load instruction 20, compare instruction 25 and store instruction 30 are utilized to implement a read-modify-write operation. Typically, registers are associated with the various operands for the instructions of FIG. 2.

A typical load (read) instruction is comprised of an opcode operand 21, a source operand 22 and a destination operand 23. The opcode operand 21 identifies that this instruction is a load instruction. The source operand 22 identifies a source location (SRC1 in the example). In this instance, SRC1 is a memory address location where source data is found. The data at the location addressed by SRC1 is identified as such by placing SRC1 in brackets ([SRC1]). Thus, in reference to FIG. 1, SRC1 is a memory location where the lock 16 value can be found and this lock value is to be noted as [SRC1].

The destination operand 23 identifies a destination (DEST in the example) where [SRC1] is to be loaded. It is also to be noted that an offset (or "immediate") operand may be present. This offset or immediate is used to provide for an offset from a base address (such as SRC1) when addressing the memory 12. The instructions noted below may have such offsets, but are not illustrated.

Once the lock value [SRC1] is loaded from memory to the destination location as DEST, the second instruction 25 is used to test the value of the lock 16. In the particular example described herein, the instruction 25 is a compare instruction, which compares two values to test the lock. An operand 26 provides the opcode for executing the compare operation in instruction 25. Two source operands 27 and 28 are associated with the compare instruction 25. In the example, the first source operand 27 has SRC1 and is equivalent to the operand 22 of the instruction 20. That is, operand 27 points to the lock location. The second operand 28 identifies a second source location (SRC2 in the example). When the instruction 25 is executed, the data [SRC1] is compared to [SRC2] to determine if the two are equal in value. The value for [SRC2] is previously set to a value associated with an unlocked state for the lock 16.

Accordingly, to test the lock 16, the data [SRC1] is fetched and compared to the data [SRC2]. The compare operation will either set a flag or cause a value in one of the registers to be changed to reflect the comparison. The execution of a compare instruction is generally known.

In the specific example noted herein, a test-and-set sequence will then result in the following. If the comparison results in a true condition ([SRC1]=[SRC2]), it signifies that the lock value has not been modified (the lock is in the unlocked state). Thus, when this condition is met, the third instruction 30 is executed to modify the lock value to a locked state, in order to prevent other agents from having access to the shared space. The third instruction 30 is a store instruction. Opcode operand 31 identifies that the instruction to be executed is a store (write) instruction. The store instruction 30 also includes two source operands 32 and 33.

The instruction 30 causes data identified in the second operand 33 to be written to a location addressed by the first operand 32.

In the example, the first source operand 32 identifies the same SRC1, which is the location of the lock. The second source operand 33 identifies SRC3, which is a modifying value for the lock 16. [SRC3] is previously set to a value associated with the locked state for the lock 16. Accordingly, the store instruction 30 causes [SRC3] to be written to the lock location, so that this value now places the lock 16 into a locked state or condition. The processor executing this operation now controls access to the shared space 15.

If, however, the above comparison operation did not result in a match when the comparison instruction was executed ([SRC1] <[SRC2]), then the lock is released without any modification to its current value. It is appreciated that this condition ([SRC1] <[SRC2]) signifies that some other agent has already modified the lock value and has control of the shared memory space. Typically, if access is first refused, the interrogating agent will continue to retry for the access until access is acquired.

When the above operation is executed, it is important that only one agent at a time be allowed access to read and modify the lock 16. Otherwise, a second agent can acquire (or attempt to acquire) the lock 16 as well. Thus, the system must ensure that once the read phase commences with instruction 20, no other reads are permitted to acquire the lock 16 until after the lock 16 has been released. The write phase of the operation releases the lock 16.

In the example of FIG. 2, the store instruction 30 executes the write to release lock 16 by writing the modifying value to lock 16. If the comparison does not permit the lock value to be modified, then a store instruction 35 is executed to write the read value back to the lock. The store instruction 35 is equivalent to the store instruction 30, except that the second source operand 34 contains the DEST data loaded earlier. Thus, in this action, the lock value loaded as DEST is returned to the original location.

The operations performed by the instructions noted in FIG. 2 can also be explained by the following operative sequence.

DEST←[SRC1] (Read operation to load the lock value)
If
    [SRC1]=[SRC2] (Compare operation to compare the lock value to a reference value [SRC2])
then,
    [SRC1])←SRC3 (Write operation to modify the lock with the value SRC3, if the lock is open)
else,
    [SRC1])←DEST (Write operation to return the original lock
value,
    if the comparison shows that the lock is already acquired by another agent).

When the processor completes its access(es) to the shared memory space 15, it will typically release its control over the shared memory space 15 with a write cycle to the lock 16 to unlock it, so that other agents can now gain entry into the shared memory space 15. However, it is appreciated that how the processor releases the shared memory space is a design choice, which could be dictated by the system architecture.

Figure 3:
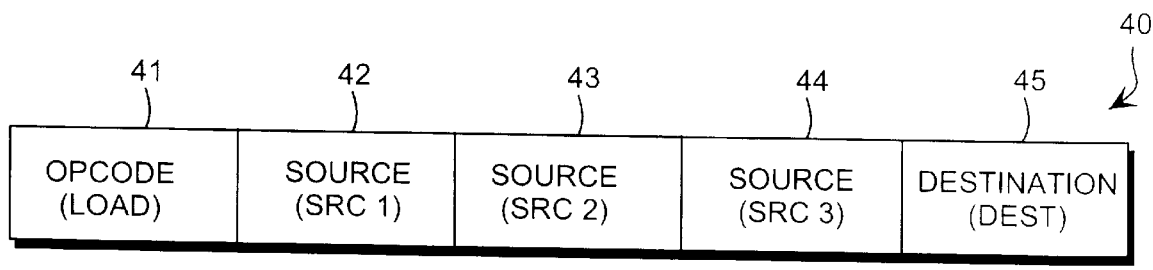
FIG. 3 shows an encoding scheme of a single compare-and-exchange instruction to perform the function of the instructions shown in FIG. 2.
Figure 4:
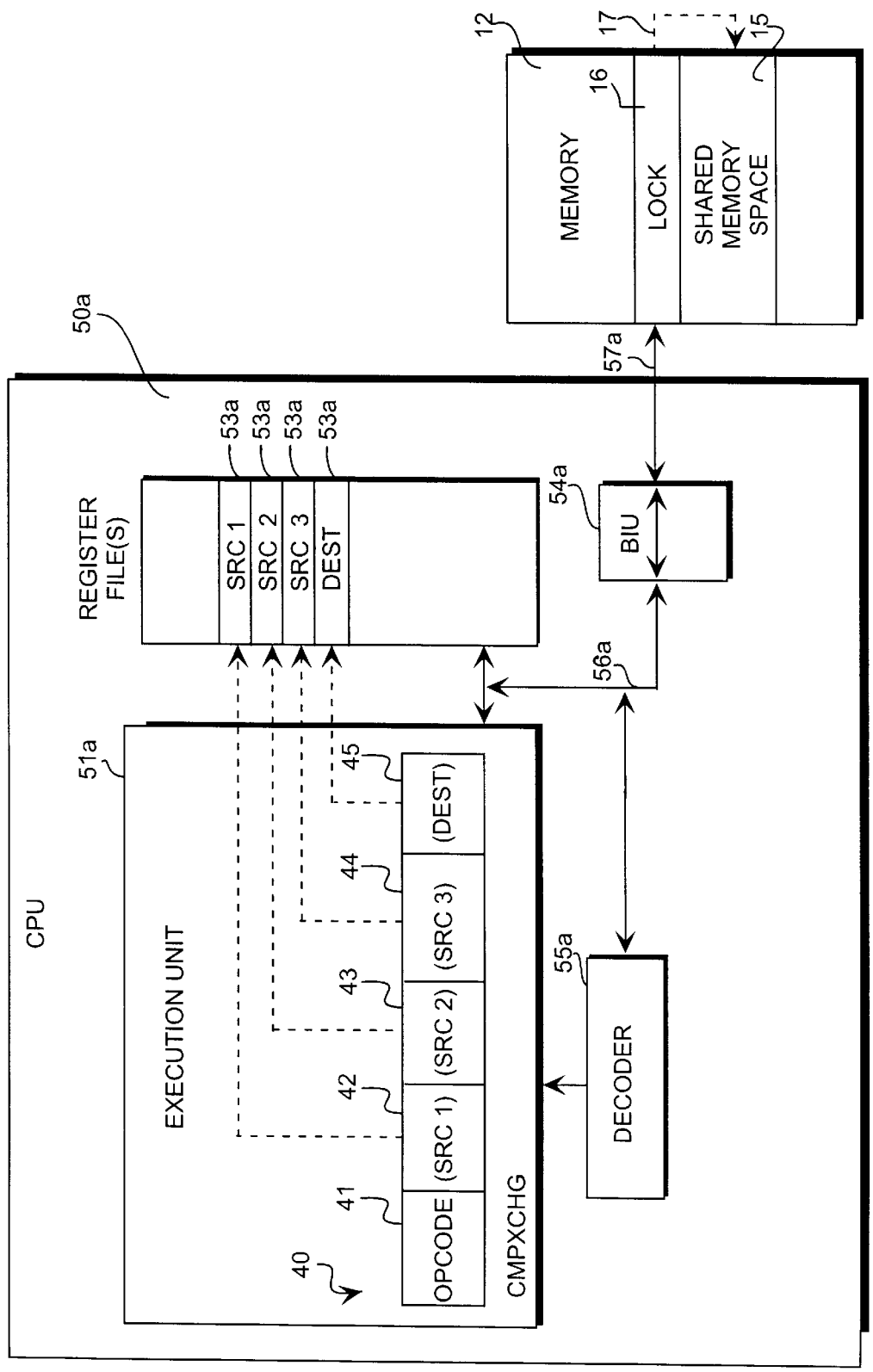
FIG. 4 is a block diagram of a prior art computer system for implementing the instruction format shown in FIG. 3.

A problem of implementing a read-modify-write sequence of FIG. 2 as a single atomic instruction is illustrated in FIG. 3 and in the associated circuit diagram of FIG. 4. FIG. 3 shows an instruction for performing a readmodify-write operation, which is equivalent to the load-compare-store instructions of FIG. 2. However, the instruction 40 is a single atomic instruction comprised of operands associated with SRC1, SRC2, SRC3 and DEST, which were noted in FIG. 2. The operation performed by the instruction 40 (which is noted as a compare-and-exchange (CMPXCHG) instruction) is equivalent to the operations performed by the instructions 20, 25, 30 and 35. The instruction 40 is comprised of five operands 41–45. Opcode operand 41 identifies that this is a CMPXCHG instruction. The operands 42–45 correspond to the source and destination operands associated with SRC1, SRC2, SRC3 and DEST.

The block diagram of FIG. 4 illustrates the information flow when instruction 40 is executed. The processor is shown as a central processing unit (CPU) 50a which includes an execution unit 51a, register file 52a, a bus interface unit (BIU) 54a, and decoder 55a, which are all coupled together by a bus 56a. The register file 52a is comprised of a plurality of registers 53a which are accessed by the execution unit 51a for executing the various instructions. As noted in FIG. 4, the CMPXCHG instruction 40 is shown resident within the execution unit 51a and dotted lines are shown from the operands of the instruction to the corresponding registers associated with SRC1, SRC2, SRC3 and DEST. The registers reside within the register file 52a. The decoder 55a is used to decode the various instructions (including the CMPXCHG instruction 40), in order for the execution unit 51a to operate on the instructions. The general operation of a processor is known to those skilled in the art.

The memory previously described in FIG. 1 is shown coupled to the BIU 54a by bus 57a. Accordingly, data transfers between the CPU 50a and the memory 12 occur through the BIU 54a. It is to be appreciated that the program routine utilizing the CMPXCHG instruction 40 typically resides within some memory, which could also be or include the memory 12. When the CMPXCHG instruction 40 is decoded and is ready for execution by the execution unit 51a, the following sequence of operations occur. However, prior to the execution of the instruction 40, SRC1, SRC2 and SRC3 are loaded in the registers 53a.

The operative sequence for instruction 40 when executed is equivalent to the operative sequence described earlier in reference to FIG. 2 for SRC1, SRC2, SRC3 and DEST. Although the operation of the CMPXCHG instruction 40 operates as a single instruction to provide the read-modify-write operation as desired for the test-and-set sequence for the lock 16, the length of the instruction can present a problem in certain instances. That is, where complex instruction sets may be desirable in some architectures, other architectures, such as reduced-instruction-set-computing (RISC) architectures may not permit the use of such lengthy instructions requiring three source and one destination operands. Furthermore, there may be a limitation on the number of bits allowed in an instruction and such limitation may prohibit the use of three source operands, as well. Additionally, when instructions having three source and one destination operands are utilized, the format of the instruction will not fit into the typical load/store format. In order to accommodate the additional operands, additional circuitry (which may include additional register ports) is usually required. Thus, it is generally not desirable to have three source and one destination operands in an instruction. Thus, in order to simplify the format of the instruction 40 and to conform the instruction 40 into an existing load/store format, the present invention employs the following.

Figure 5:
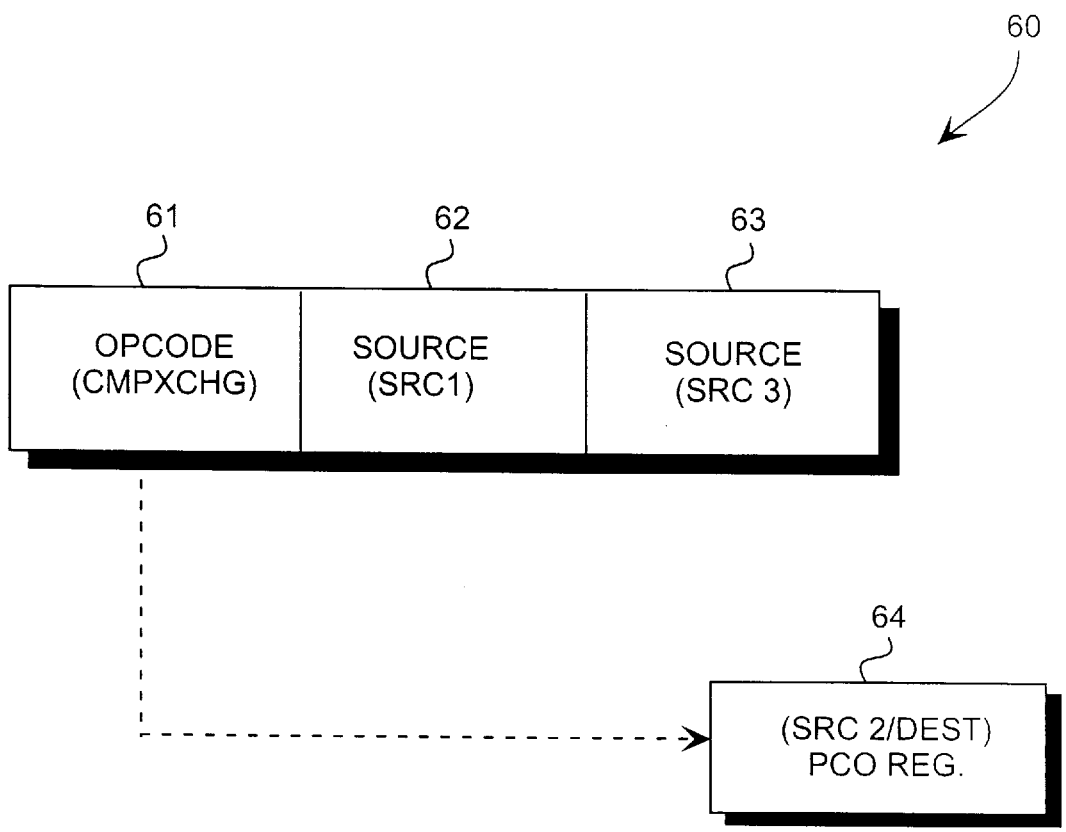
FIG. 5 shows an encoding scheme of a compare-and-exchange instruction of the preferred embodiment in which only two source operands are used instead of the three source and one destination operands required in FIG. 3, but providing the additional operands by an implementation of an operation-specific register.

Referring to FIG. 5, a CMPXCHG instruction 60 of the preferred embodiment is shown. Unlike the CMPXCHG instruction 40 of FIG. 3, instruction 60 comprises of an opcode operand 61 and two source operands 62–63. The first source operand 62 is used to convey the location of SRC1 information and the second source operand 63 is used to convey the SRC3 information. The operands for providing the SRC2 and DEST information are not included in the CMPXCHG instruction 60.

The SRC2 and DEST information are not included in the instruction 60 itself, but the location where this information is stored is implied. That is, whenever this instruction 60 is executed, the decoding logic decodes the instruction 60 so that a dedicated, operation-specific register, which is referred to as a process-compare-operand (PCO) register 64, is accessed for executing the instruction. Accordingly, a dotted line is shown in FIG. 5 to illustrate that the necessary SRC2 and DEST information are obtained by accessing the PCO register 64. The processing architecture showing the preferred implementation of the PCO register 64 is shown in FIG. 6.

Figure 6:
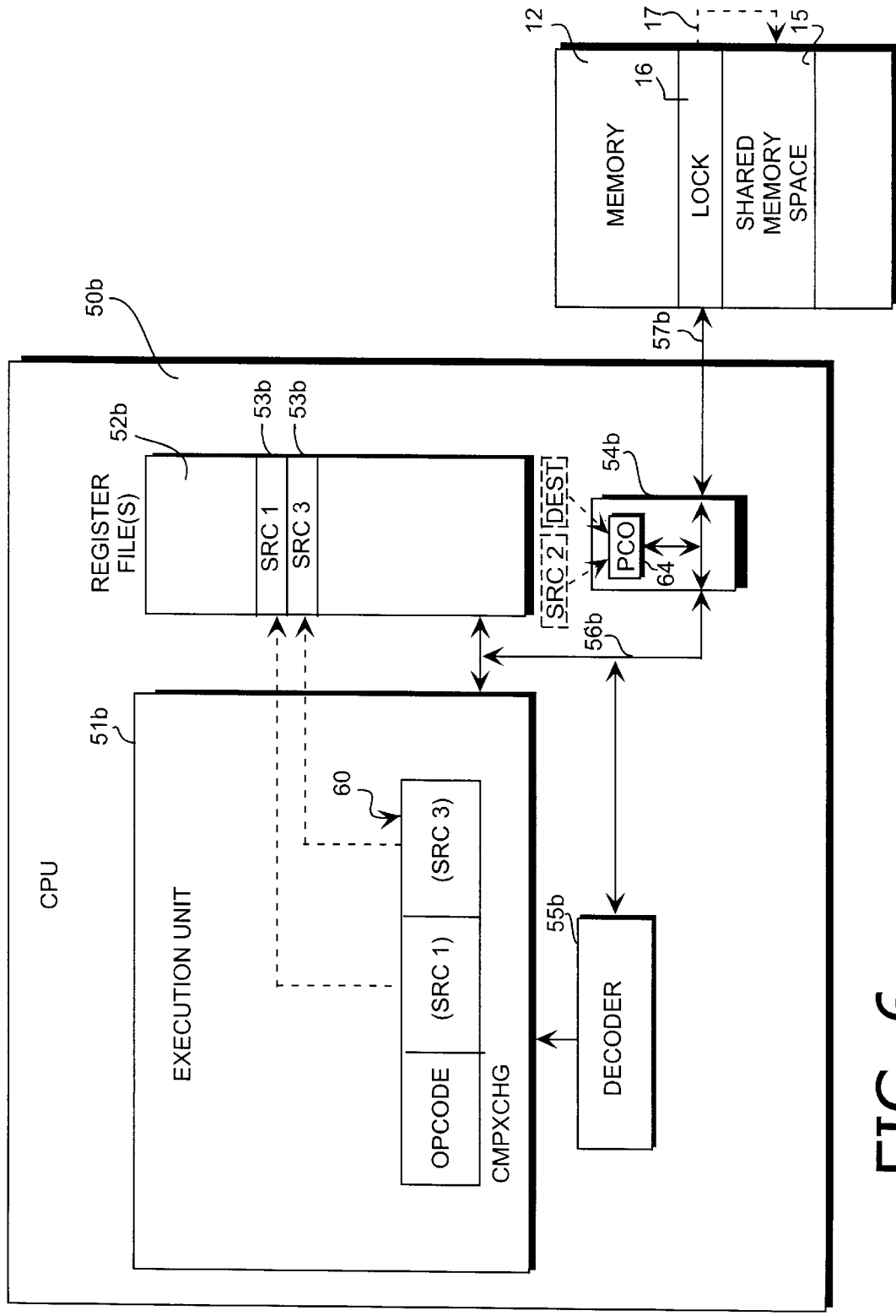
FIG. 6 is a block diagram of a computer system showing one technique for implementing the instruction format of the compare-and-exchange instruction of the preferred embodiment shown in FIG. 5.

Referring to FIG. 6, a CPU 50b employing the present invention is shown having an execution unit 51b, register file 52b (comprised of registers 53b) and decoder 55b coupled together by a bus 56b. These components are equivalent to like numbered components in FIG. 4, except that the decoder 55b and execution unit 51b are capable of executing instruction 60, instead of the instruction 40. Thus, the execution unit 51b executes the CMPXCHG instruction 60, which identifies SRC1 and SRC3 as contained in the registers of the register file 52b.

A BIU 54b is equivalent to the BIU 54a for transferring data between the buses 56b and 57b, but is different in the respect that the BIU 54b includes the PCO register 64. As noted above, the PCO register 64 is an operation-specific register that is used when the CMPXCHG instruction 60 is executed. The use of the PCO register is implied by the CMPXCHG instruction 60. The PCO register is used for saving (or storing) both the SRC2 and DEST information at different times during the execution of the instruction 60. Thus, the PCO register 64 functions as a register for SRC2 or a register for DEST of FIG. 4 at different periods during the execution of the instruction 60. The Bus 57b then couples the BIU 54b to the memory 12.

Prior to the execution of the instruction 60, the SRC1 and SRC3 information are loaded into the appropriate registers 53b. The SRC2 information is also loaded into the PCO register 64. The SRC2 information is always loaded into this dedicated register.

Subsequently, when the CMPXCHG instruction 60 is executed, the following operation is performed by the instruction.

If,

[SRC1]=$PCO_{SRC2}$ ($PCO_{SRC2}$ is used to denote SRC2 data which is present in the PCO register)

then,

1) $PCO_{DEST}$←[SRC1]; followed by
2) [SRC1]←[SRC3]

else,

1) $PCO_{DEST}$←[SRC1]; followed by
2) [SRC1]←$PCO_{DEST}$ ($PCO_{DEST}$ is used here to denote that the PCO register is functioning as a destination register to hold the DEST data).

Accordingly, the first operation accesses the lock value [SRC1] and compares it to the reference value [SRC2] stored in the PCO register 64. If the comparison is true, signifying that the lock is in the unlocked state, then two operations are performed. The lock value [SRC1] is first loaded into the PCO register 64 and then the modifying value SRC3 is written as the new lock value to the lock 16.

If the comparison results in a not true condition, the lock value [SRC1] is loaded into the PCO register 64 and then this information is written back to the lock 16 location. The [SRC1] is always loaded into the PCO register, whether the comparison results in a true (or not true) condition. One or the other of the two write operations to the lock signifies the end of the execution cycle, which will then release the lock access so that other agents can now interrogate the lock 16.

Subsequently, when the acquiring agent has completed its access(es) to the shared memory space, it will need to reset (or modify) the lock 16 to the open (or unlocked) condition so that other agents can now gain control to access the shared memory space. How the system releases the control over the shared memory space is a design choice (perhaps dictated by the system architecture). Generally, an unlocked status value is written to the lock 16. Alternatively, another technique is to write back the original unlocked value saved in the PCO register ($PCO_{DEST}$) to the lock 16. Thus, the $PCO_{DEST}$ value saved in the PCO register can be written back to the lock 16 location or if the unlocked value is written from another source, that value can be compared with the $PCO_{DEST}$ value to determine if the change was successful.

It is to be appreciated that the value of the lock controls access to the shared memory space 15, but the CMPXCHG instruction 60 is an atomic instruction for acquiring, modifying and releasing its acquisition of the lock 16 itself. Once the lock 16 is acquired, no other agent may acquire it for interrogation of the lock value, until the first agent releases the lock 16. This is true whether the lock value is modified or not by the first agent acquiring the lock 16.

Accordingly, the compare-and-exchange instruction 60 of the present invention allows for a single atomic instruction to be used to provide an atomic read-modify-write operation, which can be used to test and acquire a lock that controls access to a memory space shared by multiple memory accessing agents. However, the present invention need not be limited to computer systems having multiple processors or memory accessing devices. The present invention could be readily utilized in a single processor system, where a read-modify-write instruction is implemented. The exemplary instruction of the preferred embodiment allows for two operands (one source and one destination) to be implied, so that these operands need not be included in the actual instruction itself. Therefore, only two source operands are required in the instruction.

In the particular implementation of the present invention, the implied operands are implemented in a dedicated PCO register which stores the [SRC1] and DEST information at different periods during the execution of the instruction. Thus, by using a dedicated, operation-specific register, two operands need not be specified in the instruction and, more specifically, only two source operands are required in the instruction.

Advantages of employing such a technique are many. A read-modify-write operation requiring a single instruction with a lengthy format or multiple instructions may not be desirable in certain bit-limiting or operand-limiting architectures. The CMPXCHG instruction 60 is a single atomic instruction which overcomes these disadvantages. The CMPXCHG instruction 60 of the preferred embodiment has an instruction format similar to a store instruction in current practice. That is, the instruction requires only two source operands where three are needed to execute a read-modify-write operation. The third source operand is implied in the PCO register. Accordingly, the CMPXCHG instruction 60 of the present invention can be readily adapted for use in an instruction set of a processor implementing a RISC architecture, which stresses a need for simpler instructions.

Furthermore, where this additional complexity could impose the requirement of additional register ports to be implemented in the execution unit of a CPU to implement a three source/one destination instruction, no such requirement is imposed by the instruction of the preferred embodiment. Since the dedicated register is built into the bus interface unit, the register file of the processor need not be altered. Thus, the CMPXCHG instruction 60 would appear as a functional equivalent of a store instruction from the standpoint of the processor instruction format, since the PCO register is located in the BIU 54b (instead of in the register file 52b). However, it is appreciated that the PCO register can be designed at other locations within the processor, or even external to the processor.

It is further appreciated that the access controls to shared areas of the memory can be achieved by means other than the test-and-set sequence described in the example above. For example, a simple counter can be used in which each access is incremented by a specified count. Such techniques are known in the art.

It is also appreciated that the CMPXCHG instruction of the preferred embodiment performs the read-modify-write operation, but that the modifying and writing phases are achieved essentially as a single step. Instead of calculating a modifying value after reading the original data and then subsequently writing the modifying value, the modifying value of the CMPXCHG instruction is preset for use by the instruction. Although its use is dependent on the decision obtained when the comparison is made, this preset modifying value (SRC3) may be written immediately to the destination to modify the destination value.

Thus, a technique for implementing a read-modify-write operation which utilizes an operation-specific register is described. It is appreciated that the CMPXCHG instruction of the present invention can be utilized in other capacities as well. It need not be limited to the function of controlling the access to a shared memory space.

Two examples of implementing a CMPXCHG instruction are shown below:

Example 1

Implementation of a Test-And-Set r5=0, r6=1, r7=base address of the lock variable, off 14=offset from base loop: mtar r5, pco [move r5 to pco]
cmpxchg r6, off14(r7) [compare r(7)+off14 location to pco and if true use r(6) as modifying value]
mfar pco,r8 [move pco to r(8)]
cmpeq r8,r5,r8 [compare/equate r(8) to r(5) and put result in r(8)]
jez r8,loop [jump if zero, otherwise loop]

Example 2

Implementation of an Atomic Add r7=base address of the lock variable, off14=offset from base
ldb off14(r7), r8 [load from r(7)+off14 location to r(8)]
loop: move r8,r5 [move r(8) to r(5)]

```
addb r5,1,r6 [add 1 to r(5) and put in r(6)]/value to be
    written into lock variable is placed in r6
mtar r5,pco [move r(5) to pco]
cmpxchg r6,off14(r7) [compare r(7)+off14 location to
    pco and if true use r(6) as modifying value]
mfar pco,r8 [move pco to r(8)]
cmpeq r8,r5,r8 [compare/equate r(8) to r(5) and put
    result in r(8)]
jez r8,loop [jump if zero, otherwise loop]
```

We claim:

1. A computer system for executing an instruction that performs a read-modify-write operation comprising:

a plurality of processors, at least a first processor having an execution unit that executes said instruction and a register file that stores first and second source operands associated with said instruction;

a memory having a memory space shared by said plurality of processors;

a register coupled to said execution unit that functions as a source of a reference value during a first operation of said instruction, and as a destination that stores a lock value identified by said first source operand during a subsequent operation of said instruction;

a lock storage location coupled to said execution unit that stores data which controls access to said memory space;

wherein said first operation compares said lock value with said reference value, a true comparison resulting in said lock value being stored in said register during said subsequent operation, with data identified by said second source operand being written to said lock storage location, an untrue comparison resulting in said lock value being stored in said register during said subsequent operation, with data identified by said first source operand being written to said lock storage location.

2. The computer system of claim 1 further comprising a bus interface unit coupling said processor to said memory, said register being included in said bus interface unit.

3. The computer system of claim 1 wherein said instruction is an atomic compare-and-exchange (CMPXCHG) instruction.

4. The computer system of claim 1 wherein said register is also coupled to said memory and said lock storage location is included in said memory.

5. The computer system of claim 1 wherein said processor comprises an instruction set with each instruction specifying, at most, two source operands and one destination.

6. A processor for executing an instruction that performs a compare-and-exchange operation, said processor accessing a memory having a shared memory space, said processor comprising:

an execution unit that executes said instruction;

a register file that stores first and second source operands associated with said instruction:

a dedicated register coupled to said execution unit that functions as a source of a reference value during a first operation of said instruction, and as a destination that stores a lock value identified by said first source operand during a subsequent operation of said instruction;

wherein said first operation compares said lock value with said reference value, a true comparison resulting in said lock value being stored in said dedicated register during said subsequent operation, with data identified by said second source operand being written to said a lock storage location of said memory, an untrue comparison resulting in said lock value being stored in said dedicated register during said subsequent operation, with data identified by said first source operand being written to said lock storage location.

7. The processor of claim 6 further comprising a bus interface unit coupling said processor to said memory, said dedicated register being included in said bus interface unit.

8. The processor of claim 7 wherein said processor comprises an instruction set with each instruction specifying, at most, two source operands and one destination.

* * * * *

UNITED STATES PATENT AND TRADEMARK OFFICE
CERTIFICATE OF CORRECTION

PATENT NO.    : 5,889,983                                    Page 1 of 1
DATED         : March 30, 1999
INVENTOR(S)   : Mittal et al.

It is certified that error appears in the above-identified patent and that said Letters Patent is hereby corrected as shown below:

Column 5,
Line 49, insert -- the data -- before "[SRC2]".

Signed and Sealed this

Twenty-fifth Day of November, 2003

JAMES E. ROGAN
*Director of the United States Patent and Trademark Office*